United States Patent
Hsiun et al.

(10) Patent No.: US 7,096,245 B2
(45) Date of Patent: Aug. 22, 2006

(54) INVERSE DISCRETE COSINE TRANSFORM SUPPORTING MULTIPLE DECODING PROCESSES

(75) Inventors: Vivian Hsiun, Yorba Linda, CA (US); Alexander G. MacInnis, Los Altos, CA (US); Xiaodong Xie, Fremont, CA (US); Sheng Zhong, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 583 days.

(21) Appl. No.: 10/114,619

(22) Filed: Apr. 1, 2002

(65) Prior Publication Data

US 2003/0187895 A1    Oct. 2, 2003

(51) Int. Cl.
*G06F 17/14* (2006.01)
(52) U.S. Cl. ...................... 708/401; 708/402
(58) Field of Classification Search ............... 708/400, 708/401, 402
See application file for complete search history.

(56) References Cited

U.S. PATENT DOCUMENTS

| | | | |
|---|---|---|---|
| 5,703,799 A * | 12/1997 | Ohta | ........................ 708/402 |
| 5,995,148 A | 11/1999 | Haskell et al. | |
| 6,002,801 A | 12/1999 | Strongin et al. | |
| 6,108,633 A | 8/2000 | Kolluru | |
| 6,167,092 A | 12/2000 | Lengwehasatit | |
| 6,295,320 B1 | 9/2001 | Lim et al. | |
| 6,308,193 B1 | 10/2001 | Jang et al. | |
| 6,538,656 B1 | 3/2003 | Cheung et al. | ............. 345/519 |

FOREIGN PATENT DOCUMENTS

| | | |
|---|---|---|
| EP | 0 661 886 | 7/1995 |
| EP | 1 091 592 | 4/2001 |

OTHER PUBLICATIONS

U.S. Appl. No. 09/437,208 entitled "Graphics Display System", filed Nov. 9, 1999, Inventor: Alexander G. MacInnis et al.
U.S. Appl. No. 09/641,374 entitled "Video, Audio And Graphics Decode, Composite And Display System", filed Aug. 18, 2000, Inventor: Alexander G. MacInnis et al.
U.S. Appl. No. 09/641,936 entitled "Video And Graphics System With An MPEG Video Decoder For Concurrent Multi-Row Decoding", filed Aug. 18, 2000, Inventor: Ramanujan K. Valmiki et al.

(Continued)

*Primary Examiner*—Chuong D. Ngo
(74) *Attorney, Agent, or Firm*—McAndrews, Held & Malloy, Ltd.

(57) ABSTRACT

The present invention provides an apparatus and method for providing a programmable inverse discrete cosine transform, wherein the transform coefficients are loaded into a memory area of a core transform device and a variety of coding standards can thereby be handled by the same programmable core device. The core device is configured to process a certain sized data block, and the incoming source blocks are converted to conform to this size. After transformation, the proper sized result can be extracted from the transform device output. A switchable speed-up mode provides for 4-point transforms, rather than 8-point transforms. Alternatively, the invention also provides for dedicated transform hardware to be switchably used in conjunction with programmable transform hardware, depending upon the type of coding being used, and the speed of inverse transform desired.

18 Claims, 16 Drawing Sheets

OTHER PUBLICATIONS

U.S. Appl. No. 09/643,223 entitled "Video And Graphics System With MPEG Specific Data Transfer Commands", filed Aug. 18, 2000, Inventor: Ramanujan K. Valmiki et al.

U.S. Appl. No. 09/640,670 entitled "Video And Graphics System With Video Scaling", filed Aug. 18, 2000, Inventor: Alexander G. MacInnis et al.

U.S. Appl. No. 09/641,930 entitled "Video And Graphics System With A Video Transport Processor", filed Aug. 18, 2000, Inventor: Ramanujan K. Valmiki et al.

U.S. Appl. No. 09/641,935 entitled "Video And Graphics System With Parallel Processing Of Graphics Windows", filed Aug. 18, 2000, Inventor: Alexander G. MacInnis et al.

U.S. Appl. No. 09/642,510 entitled "Video And Graphics System With A Single-Port RAM", filed Aug. 18, 2000, Inventor: Xiadong Xie.

U.S. Appl. No. 09/642,458 entitled "Video And Graphics System With An Integrated System Bridge Controller", Inventor: Alexander G. MacInnis et al.

* cited by examiner

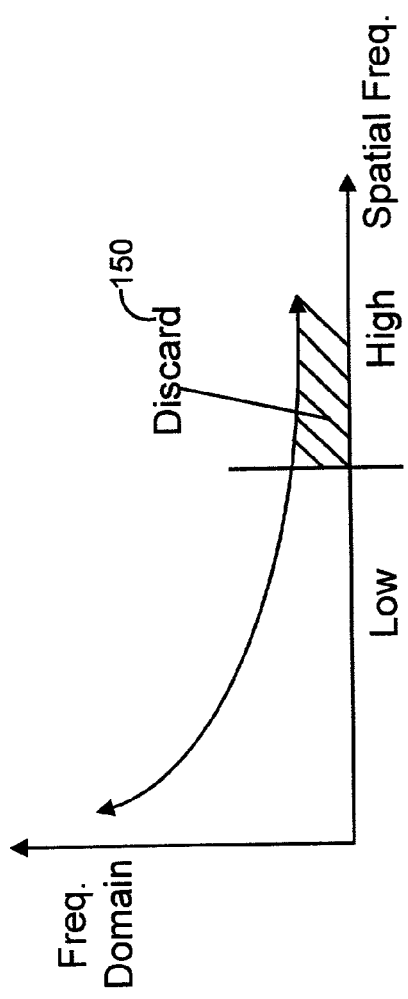
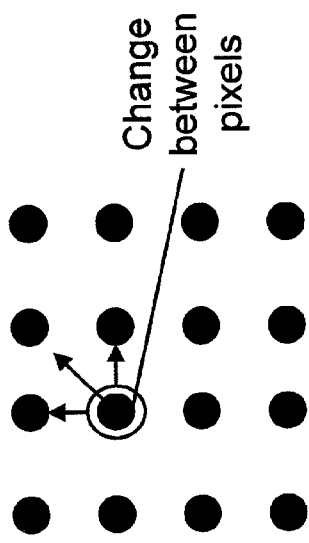
FIG. 1B
FIG. 1C $$Y = A^T X A$$

$$Y = \begin{bmatrix} \ddots \\ & A \\ & & \ddots \end{bmatrix}^T \begin{bmatrix} X \end{bmatrix} \begin{bmatrix} \ddots \\ & A \\ & & \ddots \end{bmatrix}$$

INVERSE DISCRETE COSINE TRANSFORM SUPPORTING MULTIPLE DECODING PROCESSES

INCORPORATION BY REFERENCE OF RELATED APPLICATIONS

The following U.S. patent applications are related to the present application and are hereby specifically incorporated by reference: patent application Ser. No. 10/114,679, entitled "METHOD OF OPERATING A VIDEO DECODING SYSTEM"; patent application Ser. No. 10/114,797, now U.S. Pat. No. 6,963,613 entitled "METHOD OF COMMUNICATING BETWEEN MODULES IN A DECODING SYSTEM"; patent application Ser. No. 10/114,798, entitled "VIDEO DECODING SYSTEM SUPPORTING MULTIPLE STANDARDS"; patent application Ser. No. 10/114,886, now U.S. Pat. No. 7,007,031, entitled "MEMORY SYSTEM FOR VIDEO DECODING SYSTEM"; and patent application Ser. No. 10/113,094, now U.S. Pat. No. 6,944,746 entitled "RISC PROCESSOR SUPPORTING ONE OR MORE UNINTERRUPTIBLE CO-PROCESSORS"; all filed on even date herewith. The following Provisional U.S. Patent Applications are also related to the present application and are hereby specifically incorporated by reference: Provisional Patent Application No. 60/369,144, entitled "VIDEO DECODING SYSTEM HAVING A PROGRAMMABLE VARIABLE LENGTH DECODER"; Provisional Patent Application No. 60/369,014, entitled "PROGRAMMABLE VARIABLE LENGTH DECODER"; and Provisional Patent Application No. 60/369,217, entitled "INVERSE QUANTIZER SUPPORTING MULTIPLE DECODING PROCESSES"; all filed on even date herewith.

FIELD OF THE INVENTION

The present invention provides an apparatus and method to perform an inverse discrete cosine transform for multiple decoding processes. In particular, certain coefficients are loaded for the specific transform desired, and generalized hardware can be used for various transform operations. for the specific transform desired, and generalized hardware can be used for various transform operations.

BACKGROUND OF THE INVENTION

A wide variety of multimedia devices is incorporating the ability to receive and process picture data. Multimedia devices that use picture data generally need to encode and decode the data in order to transmit and receive the encoded data across various transmission mediums. Picture data is generally displayed as a set of pixels to fill the display screen. Processing of the overall set of pixels is performed on a block-by-block basis, with each block often referred to as a macroblock.

Depending upon the complexity of hardware desired, a wide variety of transformation techniques can be used in association with processing the data block for display on a device. One commonly used video transform technique includes the use of an inverse discrete cosine transform (IDCT). In general, MPEG2 uses only IDCT. MPEG4 uses the same transform as MPEG2 (i.e., DCT, IDCT) for video texture, except that MPEG4 uses "Discrete Wavelet Transform" for still texture. Still other standards (i.e., H26L, Realvideo) might use different transformation techniques, such as a linear transformation, or the like.

FIG. 1A shows an example block diagram 100 of certain elements of a transmitter and receiver device that uses this transformation technique. The transmitter 102 first shows the pixel block 104 upon which these operations will be performed. This pixel data enters a discrete cosine transform (DCT) 106. The DCT converts a block of data from the spatial domain to the frequency domain, so that it can be processed more readily.

FIG. 1B shows an example of the frequency domain for a set of data being plotted versus the spatial frequency for a two-dimensional (2D) video array. FIG. 1C shows a representative set of such pixels, wherein the variation of information between each pixel indicates the spatial frequency. The curve in FIG. 1B indicates that, in general, pixels in a given area do not tend to have a great amount of variation between them. Therefore the frequency domain is shown to have a higher concentration for lower spatial frequencies. In light of this representative tendency of the pixel data, one technique that is commonly employed is to discard the higher spatial frequency data above a certain level, as shown by the shaded area 150. By discarding this upper frequency data, a lower bit rate on the transform coefficients can be achieved.

Referring again to FIG. 1A, a scan pattern is thereafter applied to the converted data in block 108. This block 108 is also shown to include and perform the quantizer operation on the data. Once quantized, the data is processed by a variable length coder (VLC) 112 (or the like) into a bit pattern for transmission.

On the receiving end, the receiver 120 is shown to include counterpart elements to the transmitter. A variable length decoder (VLD) 122 (or the like) receives the coded bitstream and provides a decoded bitstream. An inverse scan pattern and inverse quantizer are applied in block 124. An inverse discrete cosine transform (IDCT) 128 is thereafter applied to transform the data from the frequency domain back to the spatial (or time) domain. This transformation provides the resulting pixel block data 130 for use by a display device.

FIG. 2 shows another representative block diagram 200, wherein the IDCT is incorporated as part of the overall decoder. A generalized decoder block 202 is shown receiving a coded signal 204. A variable length decoder 206 (or the like) receives this coded signal and provides a variable length decoded signal. An IQ block 207 is thereafter applied to the output of the VLD to provide inverse quantization. An IDCT 208 is thereafter applied to the output of the IQ block to provide inverse transform information. The transformed information is then used by certain frame reconstruction operations, shown generally as block 210. A decoded signal 212 results and can be used by a display device to show the picture data.

Many different types of data signals might need to be processed, and each might require a different transform operation. For instance, MPEG2 (and MPEG4) video data will generally require a different set of transform operations (and transform coefficients) than H26L, or other coding formats. As a result, a video decoder that is capable of handling different coding formats will generally require different implementations of the IDCT to handle each format. FIG. 3 shows a representative prior art example 300 of a multi-transform implementation. In this example, the transform data 302 is evaluated in block 304 that is used to detect the data type. Depending upon the number of coding schemes accommodated, a different IDCT is provided for each data type. A switching network 305 can used to select the IDCT and might consist of hardware and/or software switching devices. IDCT 1 (306) is used to provide inverse transform data 1 (307). IDCT 2 (308) is used to provide inverse transform data 2 (309). The IDCT devices continue through IDCT n (310), which is used to provide inverse transform data n (311).

One problem with this type of prior art implementation is the need for multiple implementations of the IDCT. Given the requirement for speed in processing many video applications, this transformation block is often implemented as a separate hardware component for each type of transform needed. While such dedicated hardware might provide more overall speed, the need for multiple implementations increases the overall hardware requirements. For microchip implementations, any increase in hardware can prove to be problematic, as the footprint of the microchip is limited. Additionally, the use of more hardware and switching elements will usually require more power to be consumed.

Instead, what is needed in the field is a generalized IDCT that can be used to process many different types of data. This generalized IDCT should require only a certain amount of hardware that can be used, in a programmable manner, to transform many different data standards. The programmable hardware might also be augmented using certain dedicated transformation hardware, as needed for different applications. The programmable transformation device should incorporate techniques that allow for the processing of different sized data blocks, according to the various standards.

SUMMARY OF THE INVENTION

The present invention provides for an apparatus and method to facilitate the inverse transformation of data from the frequency domain back to the spatial domain for a variety of coding applications. In particular, coding applications that use an inverse discrete cosine transform (IDCT) can use the present invention to programmably provide an inverse transform operation. An IDCT core is provided which includes a memory area for receiving transform coefficients to perform the IDCT according to a particular coding standard. A 2-D IDCT is achieved by first performing a 1-D IDCT on the column data, and then performing a 1-D IDCT on the row data. The coding standard to be transformed is generally detected by the associated system, and the appropriate coefficients are loaded into the memory area for use by the IDCT core at the appropriate time.

A multipurpose hardware implementation for the IDCT core can be used that is capable of handling a general sized block of N'×N' data, including, for instance, an 8×8 pixel block. Other coding formats may use different sized pixel blocks (i.e., 4×4, 4×8, and 8×4). Accordingly, the present invention provides for converting an incoming block to an N'×N' (or 8×8) block, and then transforming the converted block via this same hardware implementation. The transformation is performed using the appropriate transform coefficients stored in memory associated with the IDCT core. The resulting output is converted back to the original size of the incoming block for use in a video display device, or the like.

For an 8×4 source block, alternating rows of zeros are added to convert the block to an 8×8 representation. This 8×8 block serves as the input to the 2-D IDCT core. The output is an 8×8 block, wherein the bottom four rows are discarded. Each element of the remaining 8×4 result is then multiplied by a constant (radical 2) to provide the transformed result.

For a 4×8 source block, alternating columns of zeros are added to convert the block to an 8×8 representation. This 8×8 block serves as the input to the 2-D IDCT core. The output is an 8×8 block, wherein the right four columns are discarded. Each element of the remaining 4×8 block is multiplied by a constant (radical 2) to provide the transformed result.

For a 4×4 source block, both alternating columns and rows of zeros are added to convert the block to an 8×8 representation. This 8×8 block serves as the input to the 2-D IDCT core. The output is an 8×8 block where the right four columns and the bottom four rows are discarded. Each element of the remaining 4×4 block is multiplied by a constant (integer 2) to provide the transformed result.

In certain instances, it may be advantageous to include dedicated hardware to handle the transformations. For instance, in certain situations the processing can be performed much faster by a separate processor than by switching constantly between different transformations that might require new coefficients to be loaded in the IDCT RAM.

Accordingly, one aspect of the present invention provides for An inverse discrete cosine transform apparatus comprising: an inverse discrete cosine transform core for receiving incoming data in the frequency domain and transforming the data to spatial domain; a memory device associated with the inverse discrete cosine transform core for storing transform coefficients for transforming the pixel data according to an associated coding standard, wherein the appropriate transform coefficients are loaded into the memory device according to the coding standard of the incoming data, and an inverse discrete cosine transform operation is performed by the transform core according to the stored transform coefficients.

Another aspect of the present invention provides a method for processing inverse discrete cosine data transform data blocks via a programmable inverse discrete cosine transform device, the method comprising the steps of: receiving an N×M source block; converting the N×M source block to an N'×N' data block; loading transform coefficients corresponding to a certain coding standard into a memory device associated with the programmable inverse discrete cosine transform device; applying inverse discrete cosine data transformation to the N'×N' data block via use of the loaded transform coefficients to produce an N'×N' output block; deriving an N×M result from the N'×N' output block.

Still, another aspect of the present invention provides an inverse discrete cosine transform apparatus for receiving incoming data in the frequency domain and transforming the data to spatial domain, the apparatus comprising: a programmable inverse discrete cosine transform device having a memory area for receiving transform coefficients corresponding to a certain coding standard; and at least one dedicated inverse discrete cosine transform device for processing data according to a certain coding standard, whereby the incoming data is switchably processed by the programmable inverse discrete cosine transform device or the dedicated inverse discrete cosine transform device, depending upon the coding standard to be transformed and the speed of processing desired.

Still another aspect of the present invention provides for an inverse transform apparatus for receiving incoming data in the frequency domain and transforming the data to spatial domain, the apparatus comprising: a programmable inverse transform core; a memory device associated with the programmable inverse transform core for storing transform coefficients for transforming the pixel data according to an associated coding standard, wherein the appropriate transform coefficients are loaded into the memory device according to the coding standard of the incoming data.

Still another aspect of the present invention provides for an inverse transform apparatus for receiving incoming data in the frequency domain and transforming the data to spatial domain, the apparatus comprising: a programmable inverse transform core having a least a first and second mode of operation; a flag associated with selecting the mode of operation; a memory device associated with the programmable inverse transform core for storing transform coefficients for transforming the pixel data according to an associated coding standard, wherein the appropriate transform coefficients are loaded into the memory device according to the coding standard of the incoming data, and the transform is performed in the appropriate mode according to the setting of the flag.

It is understood that other embodiments of the present invention will become readily apparent to those skilled in the art from the following detailed description, wherein shown and described are only example embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Certain aspects and advantages of the present invention will be apparent upon reference to the accompanying description when taken in conjunction with the following drawings, which are exemplary, wherein:

FIG. 1B is a representative plot of the frequency domain versus the spatial frequency for a set of pixels.

FIG. 1C shows a representative set of pixels wherein the spatial frequency is the change between neighboring pixels.

FIG. 4C shows the transform relationship of the input and output elements of FIG. 4B.

DESCRIPTION OF THE PREFERRED EMBODIMENTS

The present invention is described below in terms of certain preferred embodiments and representative applications. The example apparatus and processing methods are intended to be used with any data processing system that would benefit from having a programmable inverse discrete cosine transform (IDCT) that can handle different sizes and types of data blocks but while generally having one set of programmable of hardware elements. The present IDCT will be described in terms of video processing which uses blocks of 8×8 pixels for presentation on a display device. The present invention, however, is meant to be fully applicable to other types of systems (i.e., video or otherwise), with different sized data blocks.

The IDCT can be generally defined as:

$$f(x, y) = \frac{2}{N} \sum_{u=0}^{N-1} \sum_{v=0}^{N-1} C(u)C(v)F(u, v)\cos\frac{(2x+1)u\pi}{2N}\cos\frac{(2y+1)v\pi}{2N}$$

where x, y are spatial coordinates in the sample domain
u, v are coordinates in the transform domain $$C(u), C(v) = \begin{cases} \frac{1}{\sqrt{2}} & \text{for } u, v = 0 \\ 1 & \text{otherwise} \end{cases} \quad (1)$$

For example purpose, each pixel is represented by 8 bits per pixel. The transform coefficients, or the input to the IDCT (i.e., "X"), are represented in 12 bits, with the dynamic range being [−2048:2047]. The output from the inverse transform is represented by 9 bits with a dynamic range of [−256:255]. In general, the 8×8 inverse discrete transform shall conform to the IEEE Standard Specification for the implementation of 8×8 inverse discrete cosine transform, i.e., Std. 1180–1190, Dec. 6, 1990, which is herein incorporated by reference.

Figure 4A:
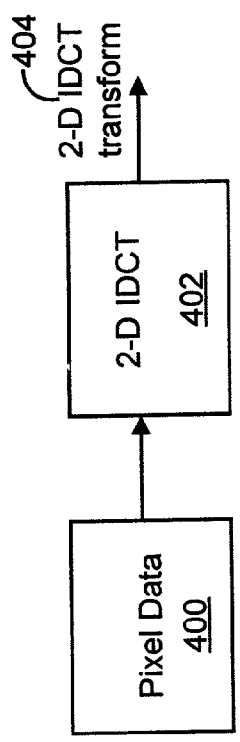
FIG. 4A is a representative block diagram of a 2-D IDCT.

A two-dimensional (2-D) IDCT is generally needed after decoding and dequantizing data of a receiving unit in order to get picture data. FIG. 4A shows a representative example where pixel data 400 is fed into a 2-D IDCT 402 in order to provide the 2-D IDCT transform 404 of the pixel data. Instead of using a direct method for calculating a 2-D IDCT, a one-dimensional (1-D) IDCT can be used twice to get the same results.

Figure 4B:
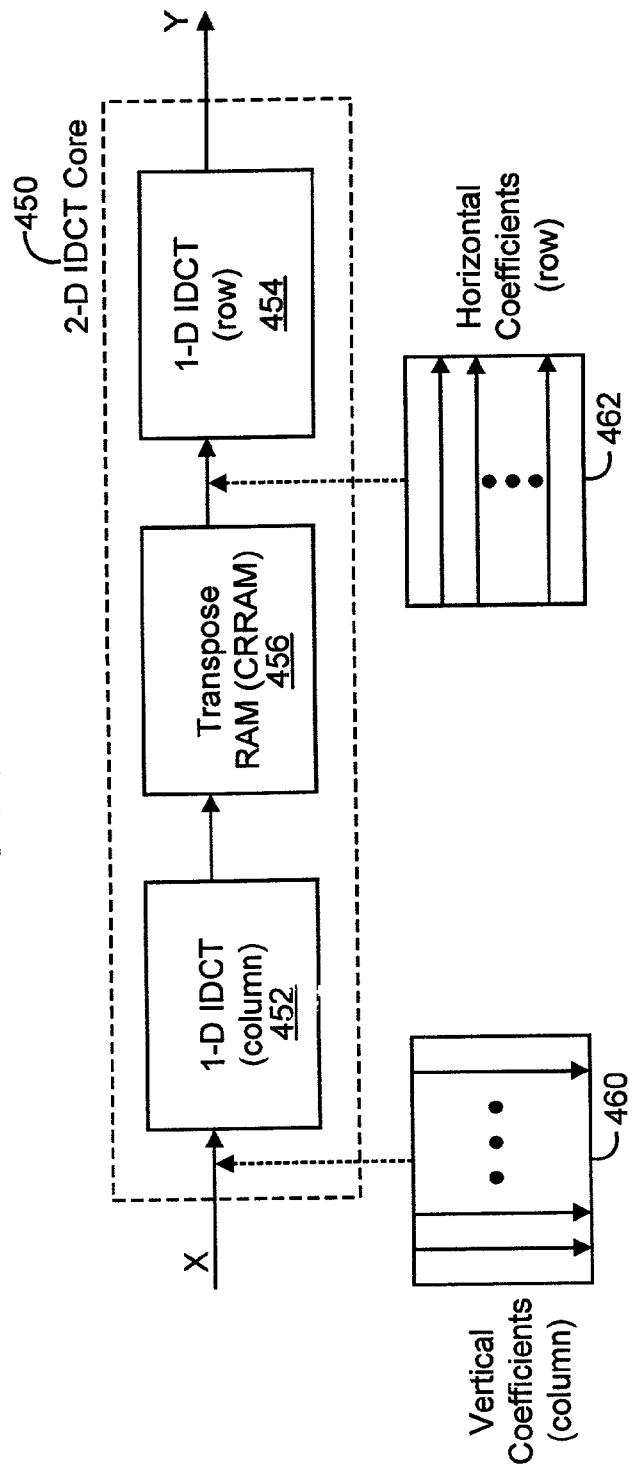
FIG. 4B is a representative block diagram of certain elements comprising a 2-D IDCT core.

FIG. 4B shows an example of certain representative elements inside of a 2-D IDCT core 450, according to the present invention. A first 1-D IDCT 452 is shown for processing the column spatial data (with block 460 showing an example of vertical, or column, coefficients). A second 1-D IDCT 454 is shown for processing the row spatial data (with block 462 showing an example of horizontal, or row, coefficients). A transpose RAM (i.e., Column-Row RAM or CRRAM) 456 is shown between the first and second 1-D IDCT devices. Accordingly, the first 1-D IDCT 452 computes the IDCT of each consecutive column of 8 pixels. A representative device might compute an 8-point 1-D IDCT in 8 clock cycles. The results are written into the CRRAM 456, which might include a dual-port SRAM used for row-column conversion. After this 1-D transform is computed, then the second 1-D IDCT 454 computes the IDCT of each consecutive row. The first 1-D IDCT might consist of a 7×16 transform coefficient RAM, i.e., 4 multipliers, 4 accumulators, a final adder, and a final rounding/saturation block. The second 1-D IDCT might consist of a 14×16 transform coefficient RAM, having 4 multipliers, 4 accumulators, a final adder, and a final rounding/saturation block. The first 7 locations (locations 0–6) might contain normal transform coefficients, which are the same as the first transform. From location 7–13, the RAM might contain normal transform coefficients times radical 2 (see further details of method below).

A simplified representation of the transform operation is shown in FIG. 4C. $Y = A^T X A$, where $A^T A = I_N$ by virtue of the orthogonality of A. A is an 8×8 matrix, and X is the input. The 1-D 8×8 IDCT can be rewritten as follows:

$$\begin{bmatrix} Y(0) \\ Y(1) \\ Y(2) \\ Y(3) \end{bmatrix} = \begin{bmatrix} a & c & a & f \\ a & f & -a & -c \\ a & -f & -a & c \\ a & -c & a & -f \end{bmatrix} \begin{bmatrix} X(0) \\ X(2) \\ X(4) \\ X(6) \end{bmatrix} + \begin{bmatrix} b & d & e & g \\ d & -g & -b & -e \\ e & -b & g & d \\ g & -e & d & -b \end{bmatrix} \begin{bmatrix} X(1) \\ X(3) \\ X(5) \\ X(7) \end{bmatrix} \quad (2)$$

$$\begin{bmatrix} Y(7) \\ Y(6) \\ Y(5) \\ Y(4) \end{bmatrix} = \begin{bmatrix} a & c & a & f \\ a & f & -a & -c \\ a & -f & -a & c \\ a & -c & a & -f \end{bmatrix} \begin{bmatrix} X(0) \\ X(2) \\ X(4) \\ X(6) \end{bmatrix} + \begin{bmatrix} b & d & e & g \\ d & -g & -b & -e \\ e & -b & g & d \\ g & -e & d & -b \end{bmatrix} \begin{bmatrix} X(1) \\ X(3) \\ X(5) \\ X(7) \end{bmatrix}$$

Where the coefficients (a, b, c, d, e, f and g) are equal to the following:

$$\begin{aligned} a &= \sqrt{2/N} \ \cos(\pi/4) \\ b &= \sqrt{2/N} \ \cos(\pi/16) \\ c &= \sqrt{2/N} \ \cos(\pi/8) \\ d &= \sqrt{2/N} \ \cos(3\pi/16) \\ e &= \sqrt{2/N} \ \cos(5\pi/16) \\ f &= \sqrt{2/N} \ \cos(6\pi/16) \\ g &= \sqrt{2/N} \ \cos(7\pi/16) \end{aligned} \quad (3)$$

These coefficients are stored in the Transform Coefficient RAM or TCRAM.

Figure 1A:
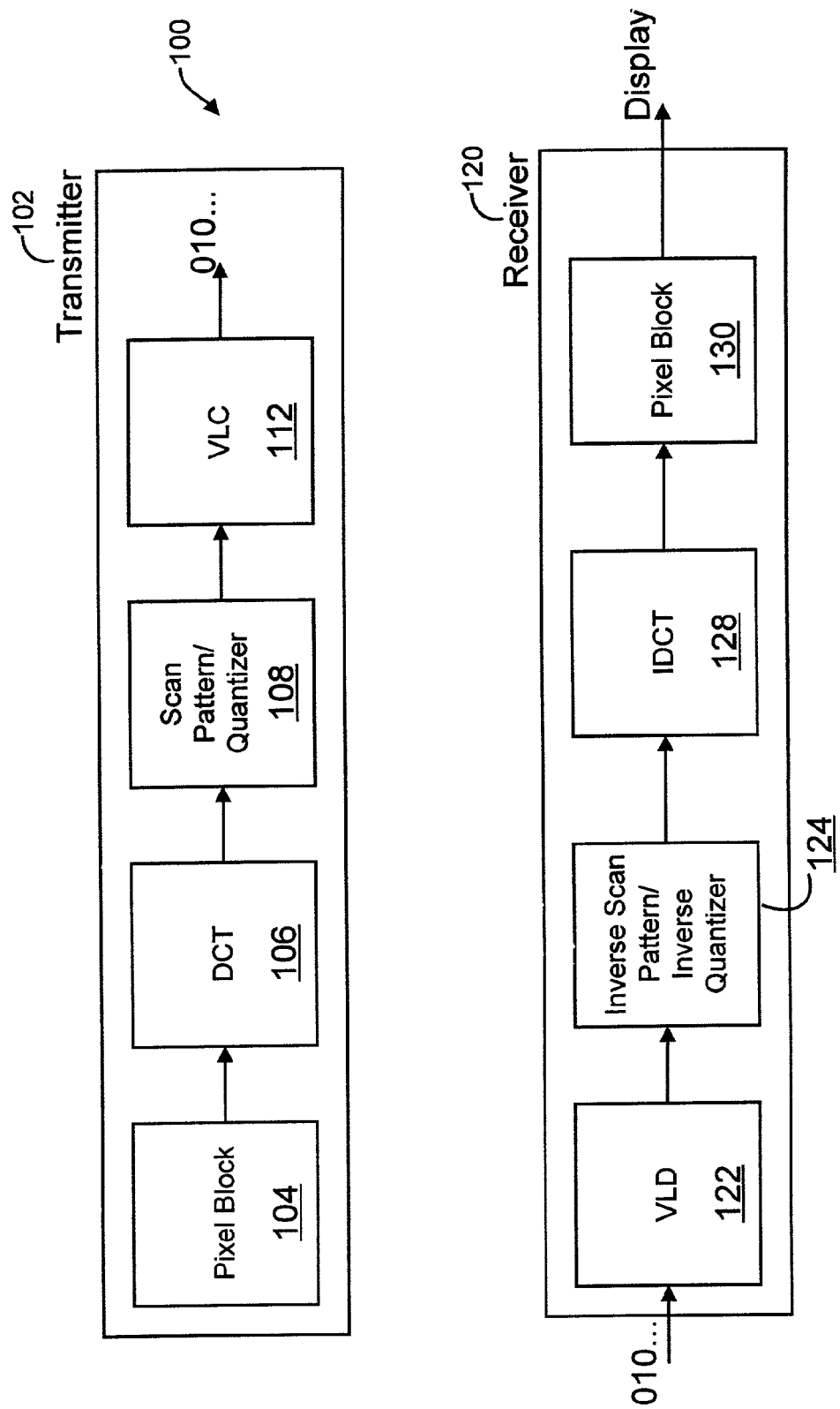
FIG. 1A is a representative prior art block diagram of an IDCT being used in a system.
Figure 2:
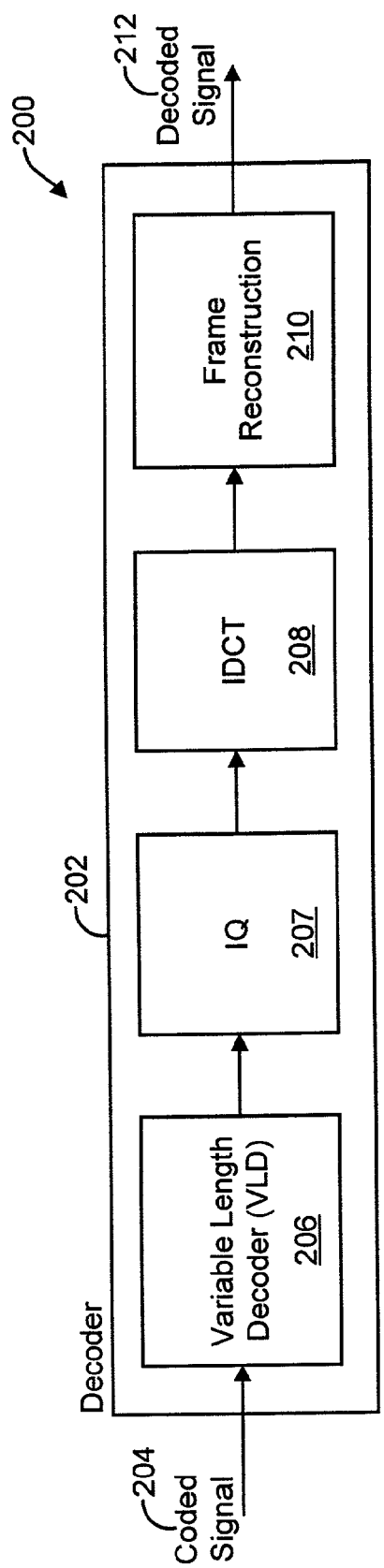
FIG. 2 is a representative prior art block diagram of a decoder that uses an IDCT.
Figure 3:
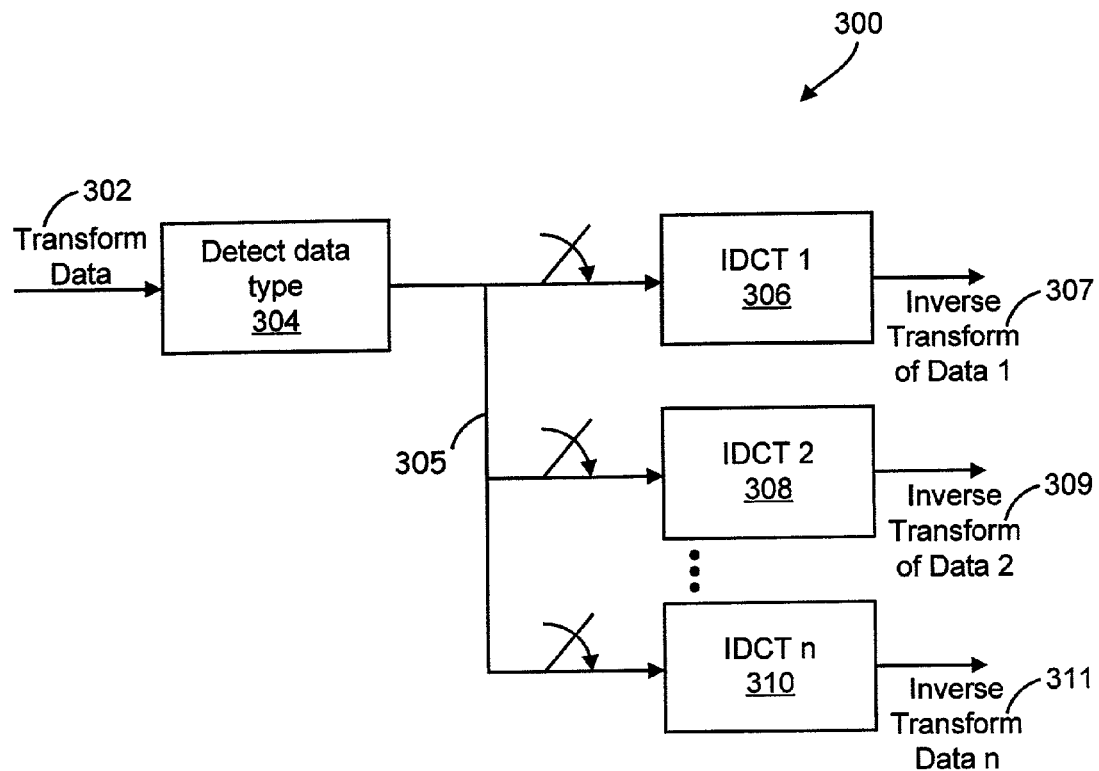
FIG. 3 is a representative prior art block diagram of multiple IDCT devices being used to switchably process data according to different standards.
Figure 5:
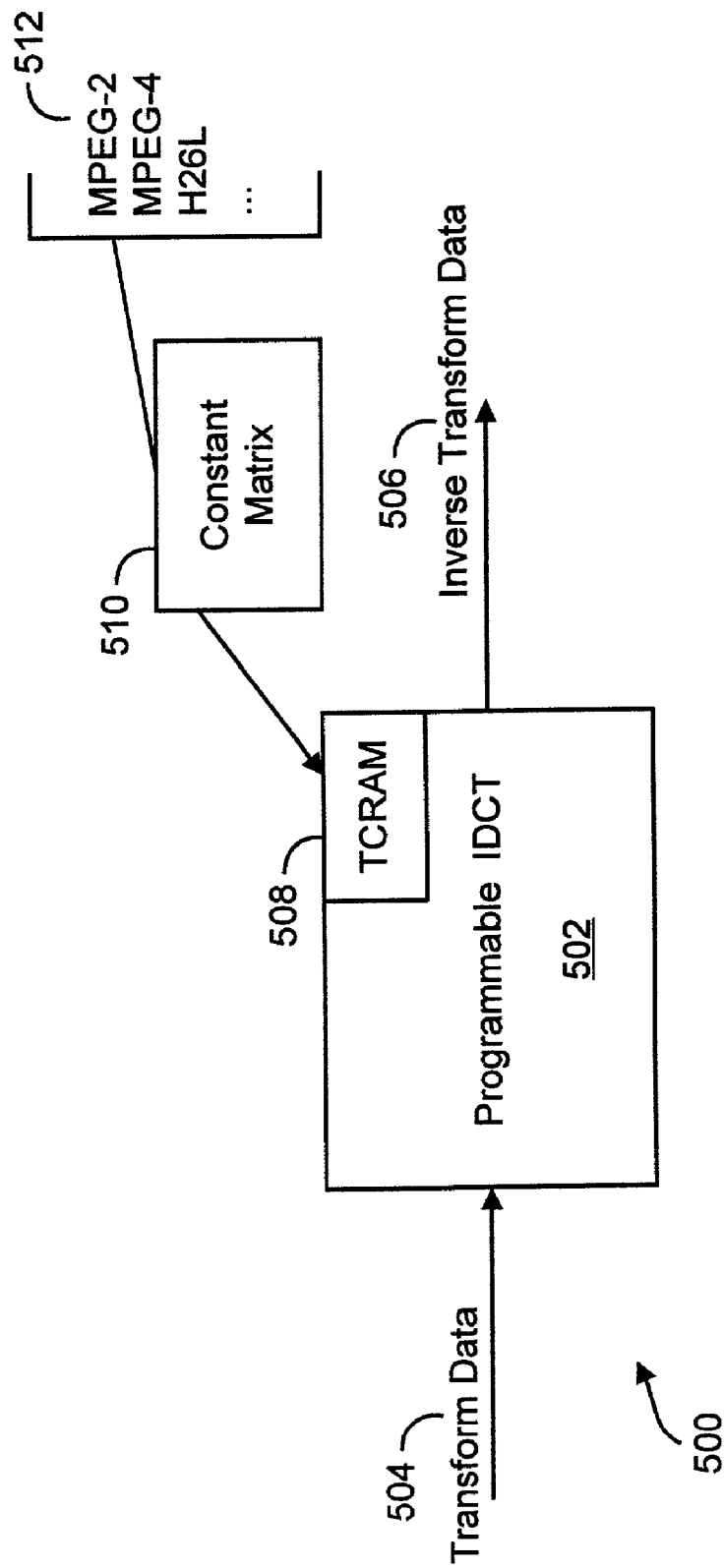
FIG. 5 is a representative block diagram of a programmable IDCT according to the present invention.

Referring now to FIG. 5, a representative block diagram 500 is shown of the programmable IDCT 502 of the present invention. Instead of having many different IDCT devices, as shown in FIG. 3, a programmable IDCT 502 is shown for receiving the transform data 504. The programmable IDCT has a TCRAM 508 associated with it, and a constant matrix 510 is loaded into the TCRAM according to the data standard that needs to be transformed. A group of representative standards is shown in the list 512. Upon using the constant matrix 510 to perform the IDCT operation, the inverse transform data 506 is produced as a result.

As indicated above, both the first and second 1-D IDCT devices have an associated TCRAM.

| TCRAM Address | Definition/Examples |
|---|---|
| The transform coefficients of the first transform TCRAM are defined as: | |
| 0 | A' |
| 1 | B' |
| 2 | C' |
| 3 | D' |
| 4 | E' |
| 5 | F' |
| 6 | G' |
| The transform coefficients of the second transform TCRAM are defined as: | |
| 0 | a |
| 1 | b |
| 2 | c |
| 3 | d |
| 4 | e |
| 5 | f |
| 6 | g |
| 7 | N/A |
| 8 | a * (radical 2) |
| 9 | b * (radical 2) |
| 10 | b * (radical 2) |
| 11 | d * (radical 2) |
| 12 | e * (radical 2) |
| 13 | f * (radical 2) |
| 14 | g * (radical 2) |

The coefficients (A', B', C', D', E', F', G') or (a, b, c, d, e, f, g) are variable. One important aspect of the present invention is that the transform can be performed on an 8×4, 4×8, or even 4×4 data block by using the same 8×8 1-D IDCT core.

Figure 6:
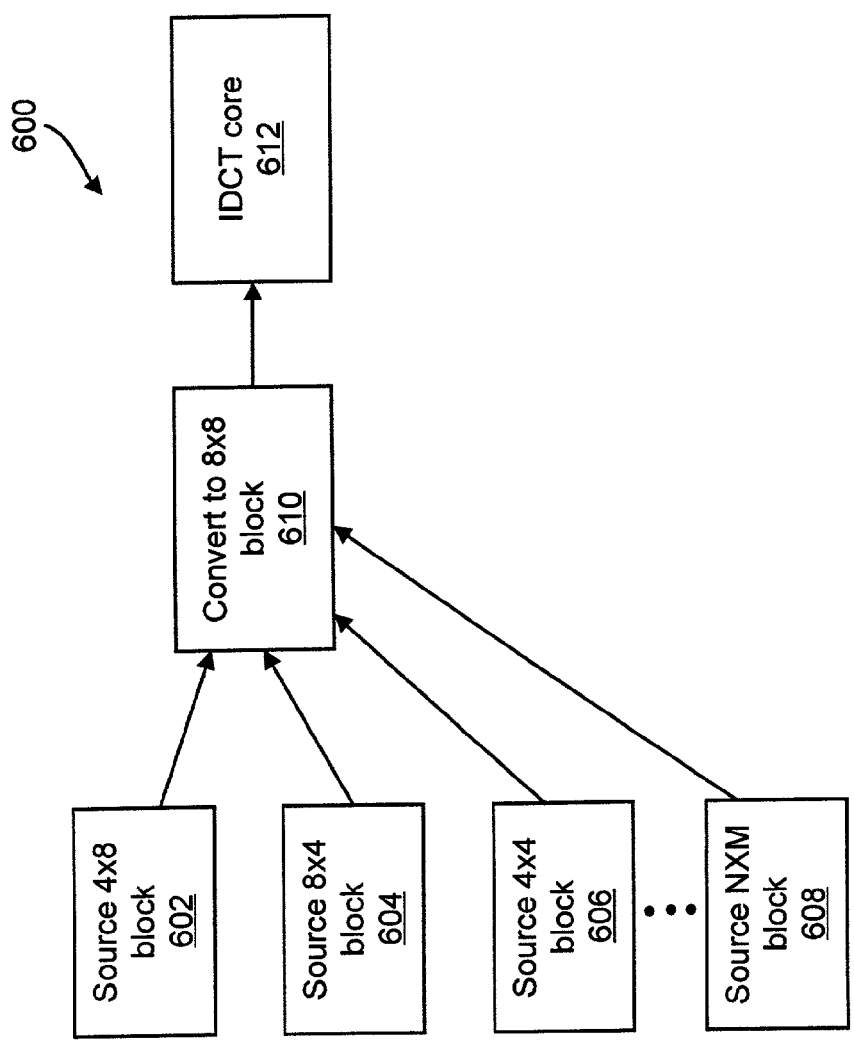
FIG. 6 is a representative block diagram of various source blocks being converted to 8×8 data blocks for processing by the IDCT core.

Referring now to FIG. 6, certain representative blocks 600 show that each of the different source blocks is converted to an 8×8 block so that the generalized 8×8 processing hardware of the IDCT core can be used. For instance, the 4×8 source block 602, the 8×4 source block 604, and the 4×4 source block 606 are converted to an 8×8 block in step 610. The various source blocks are not meant to be limited solely to these examples. For instance, a continuation is shown wherein any N×M source block 608 might be converted to an 8×8 block in step 610. The IDCT core 612 thereafter uses the 8×8 block to perform the transform operation.

Figure 7A:
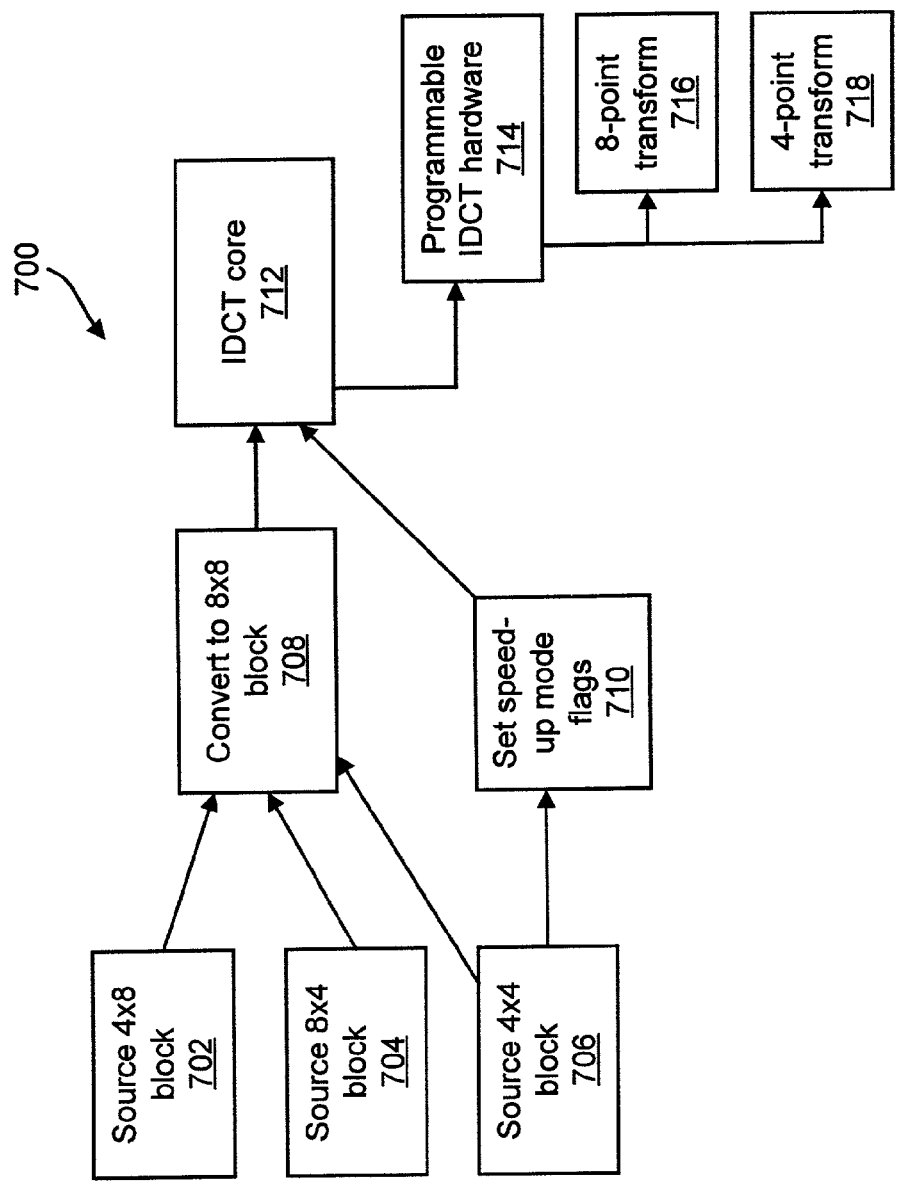
FIG. 7A is a representative block diagram of a configuration that uses programmable IDCT hardware and together with a speed-up mode for certain blocks.

FIG. 7A is meant to demonstrate a preferred embodiment where the same IDCT core (i.e., the same multipliers, adders, coefficient RAM, and so forth) is used to perform processing operations on all types of blocks, including (for instance) 4×8, 8×4, and 4×4 blocks. The representative blocks 700 show that a 4×8 source block 702 and an 8×4 source block 704 might be converted to an 8×8 block via step 708. Additionally, the 4×4 source block 706 is converted to an 8×8 block via step 708, but a "speed-up" mode is employed for processing these blocks. Step 710 shows the general processing of setting certain speed-up mode flags, which might be any general indicator to the IDCT hardware to perform operations only upon 4×4 blocks. The converted 8×8 block is then used by the IDCT core 730, which is generally configured to handle the 8×8 blocks of data (according to whatever flags might be set). The programmable IDCT hardware 714, which comprises part of the IDCT core 712, can be switchably configured to use an 8-point transformation algorithm 716 or a 4-point transformation algorithm 718.

In this instance, there is no separate or dedicated hardware to handle different kinds of blocks. Instead, the transformation algorithm (via associated software) can be employed differently depending upon the type of block. A special case exists for performing operations on a 4×4 block, wherein a speed-up mode is employed. In this mode, the transform algorithm is based on 4-point rather than 8-point, in order to speed up the performance, and accordingly the associated processor will perform a 4-point transform instead of an 8-point transformation. Certain flags (i.e., "4pt1d" and "4pt2d") might be used in association with the first and second 1-D transforms in the overall IDCT core in order to achieve these different modes. For instance, if these flags are set to high (or "1"), then a 4-point transform will be performed. Otherwise, the default configuration would be to perform an 8-point transform.

This speed-up mode provides certain advantages in that less data needs to be processed for 4-point operations. For instance, without a speed-up mode, the number of clocks to perform one 4×4 block might be as high as 64 clocks, since the operation is being treated as 8×8 block processing. In contrast, the speed-up mode treats data as a 4×4 block to process. Hence, in a comparable situation, only 16 clocks are needed to finish one 4×4 block.

Figure 7B:
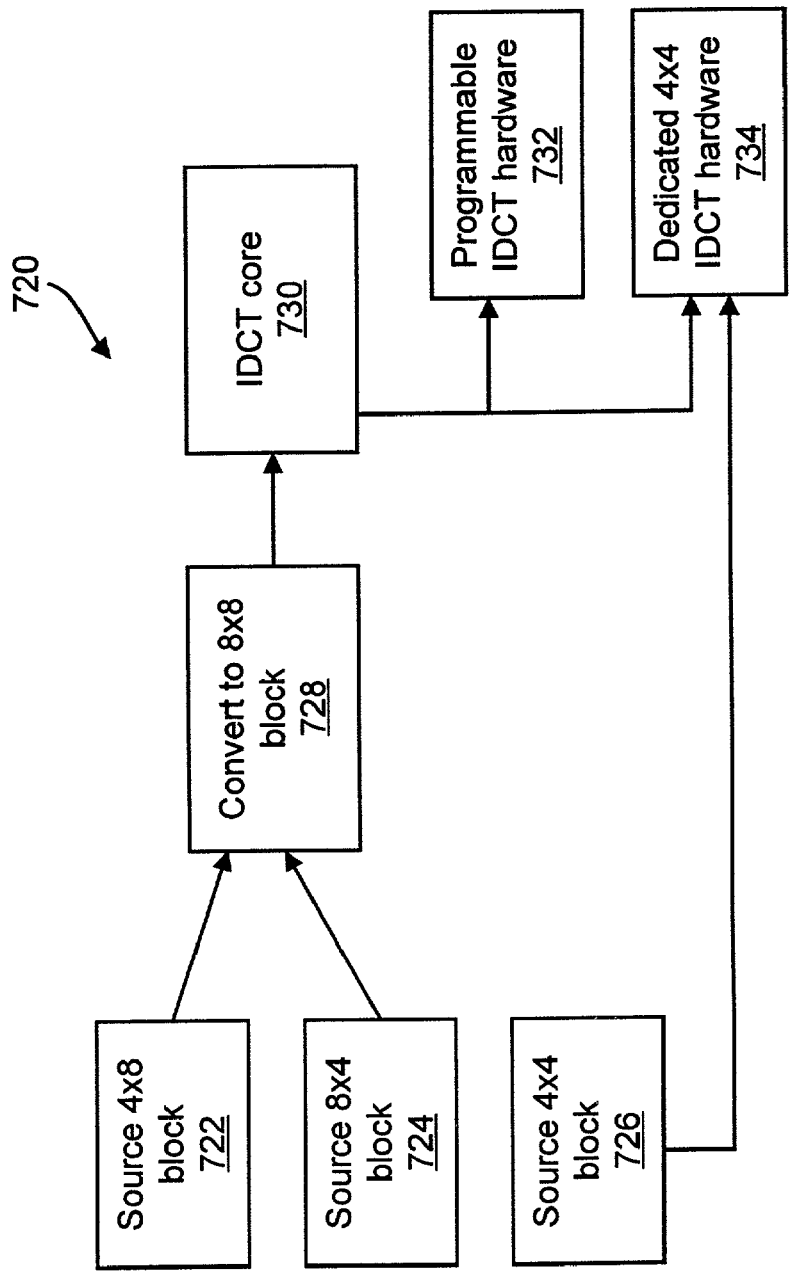
FIG. 7B is a representative block diagram of a configuration that uses programmable IDCT hardware and together with dedicated IDCT hardware.

FIG. 7B is next meant to demonstrate an alternative aspect wherein the IDCT core 730 might include both programmable IDCT hardware 732, and also certain dedicated hardware 734, according to the needs of the particular application. For instance, the representative blocks 720 show that a 4×8 source block 722 and an 8×4 source block 724 might be converted to an 8×8 block via step 728. The converted 8×8 block is then used by the IDCT core 730, which is generally configured to handle 8×8 blocks of data.

In this particular instance, the 4×4 source block 726 is linked directly to the dedicated 4×4 IDCT hardware 734. Certain sets of data might present one standard (and source block size), and then switch to yet another standard. It therefore proves to be faster to convert each incoming block up to an 8×8 block, rather than switching from one IDCT to another, which was demonstrated in the prior art. A certain amount of time, however, is also involved with the programmable solution of monitoring and converting the incoming data block from one size into an 8×8 block, and then retrieving the necessary transform coefficients in order to perform the proper transform. In certain circumstances, it may not be practical to convert every source block to an 8×8 block in order to use the generalized transformation hardware. For instance, the H26L standard only uses 4×4 blocks. Certain transformations might therefore be performed more efficiently by including dedicated hardware to perform such 4×4 operations. This additional hardware presents a tradeoff in that it requires more of the limited footprint on the chip implementation (and, for instance, uses more power). However, for certain applications, the increased speed provided by the dedicated hardware might prove to be a worthwhile tradeoff. Selectable support for the dedicated 4×4 hardware might be controlled via a switch (hardware and/or software). Typically, a bit in the data will be set to indicate that the dedicated hardware is to be used (or not).

Figure 8A:
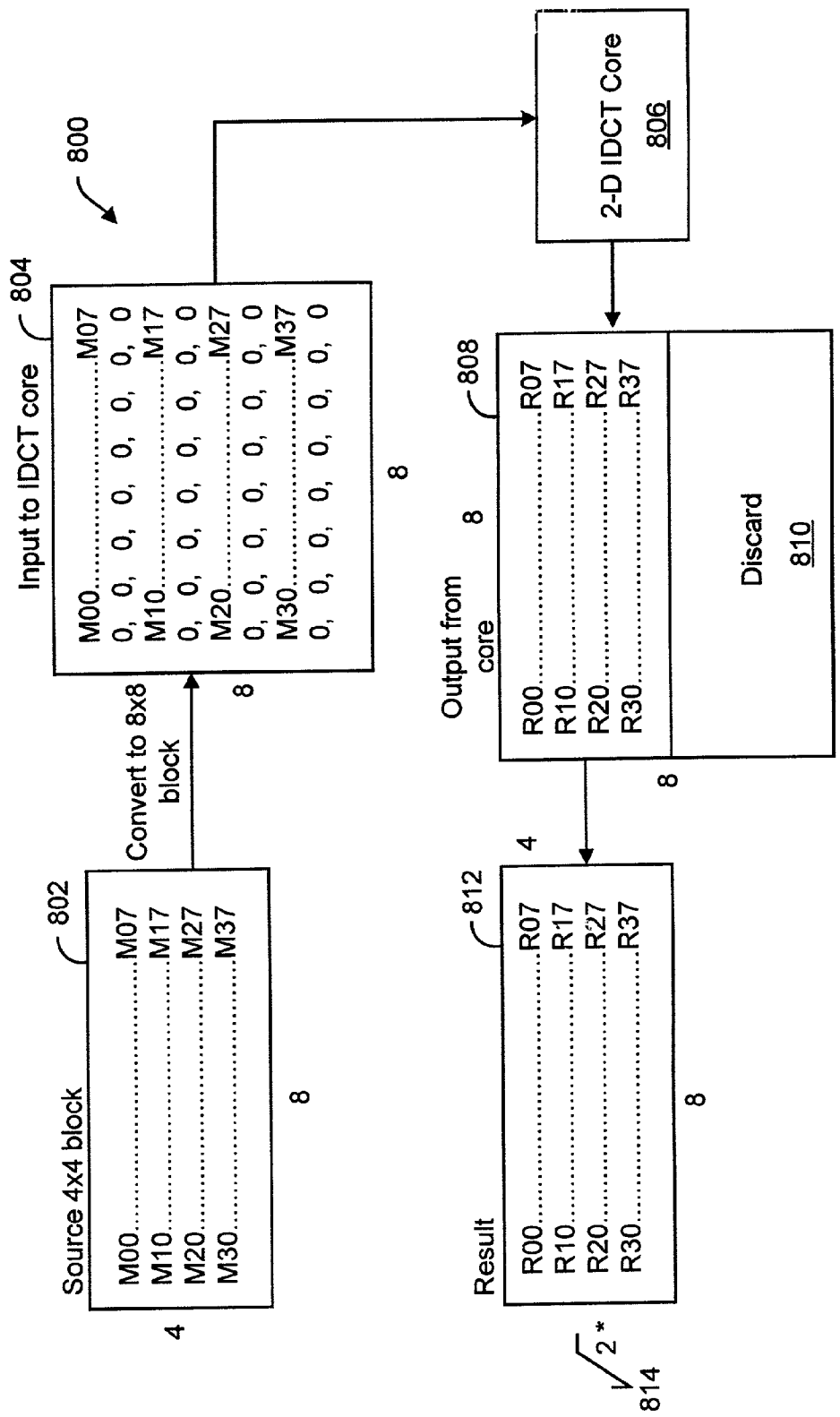
FIG. 8A is a representative block diagram of the process for transforming an 8×4 data block according to the present invention.

Referring now to FIG. 8A, a representative block diagram 800 is shown for processing an 8×4 block according to the present invention. The source 8×4 block 802 is shown having elements ranging from M00 (row zero, element zero) through M37 (row 3, element 7). Block 804 next shows the conversion process which includes adding a row of 8 zeros in an alternating manner in order to turn the 8×4 block into an 8×8 block. This 8×8 block is processed by the 2-D IDCT core 806 according to the principles described above. The output from the core 808 is an 8×8 block having elements R00 through R37 in the upper four rows. The lower four rows 810 are discarded. Each element of the 8×4 result 812 is then multiplied by a transform coefficient 814, which in this instance equals radical 2. This final multiplication could be embedded in another transform operation already being performed. For instance, the multiplication could be embedded in the transform coefficient(s) of the second (row) transform.

Figure 8B:
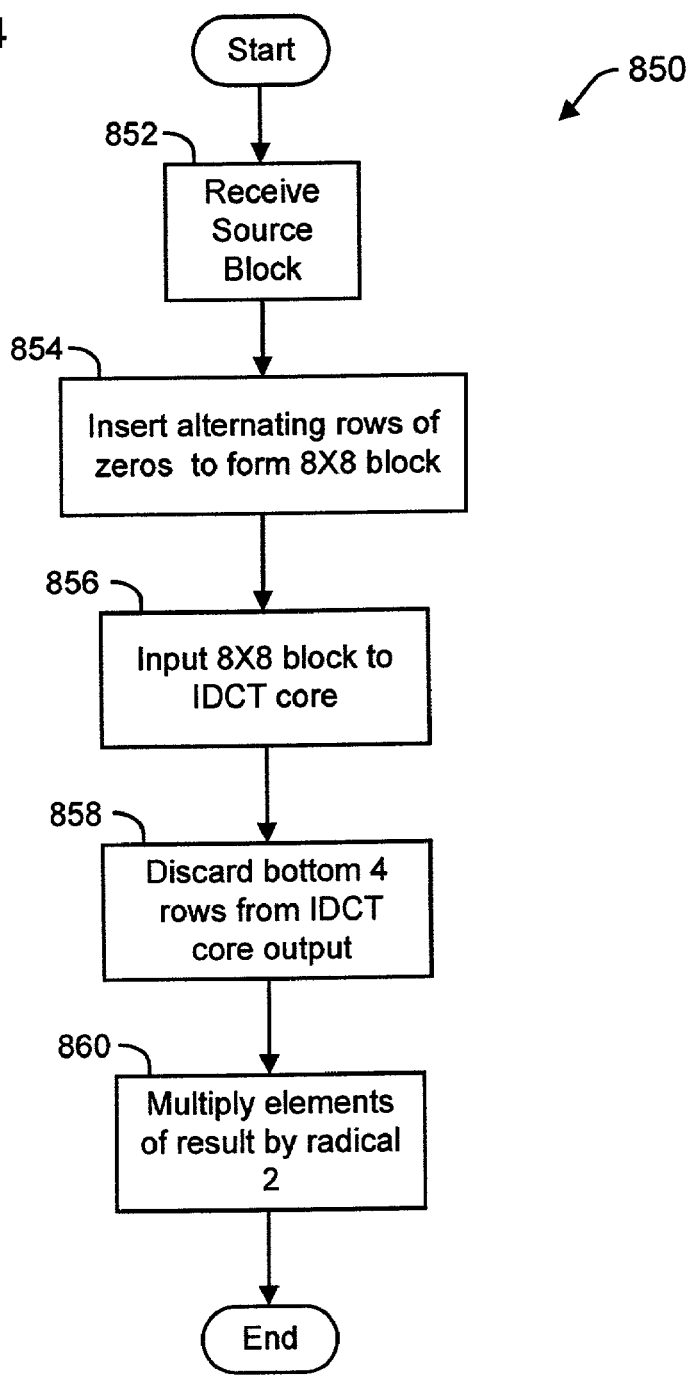
FIG. 8B is a representative flow chart for processing 8×4 source blocks in the present system.

FIG. 8B shows a similar description of the representative steps, in the form of a flowchart 850, for processing 8×4 source blocks. In step 852 the source block is first received, and a determination is made as to type of inverse processing that is needed. Step 854 shows the technique of inserting alternating rows of zeros to form an 8×8 block. In step 856, the 8×8 block is used by the IDCT core and transformed into a result. Step 858 shows the process of discarding the bottom four rows from the IDCT core output. The final result is achieved in step 860 by multiplying each of the elements of the result by radical 2.

Figure 9A:
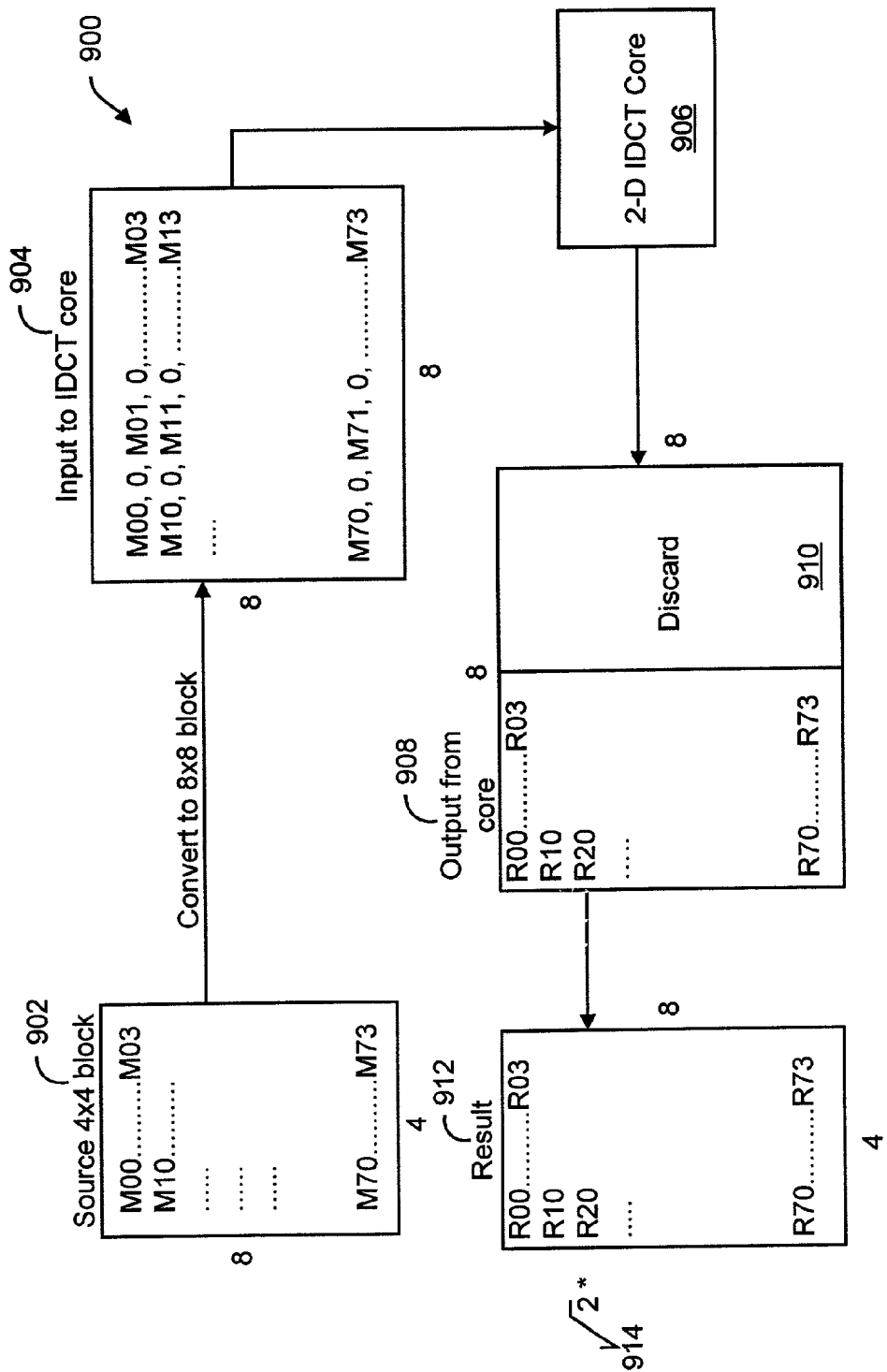
FIG. 9A is a representative block diagram of the process for transforming a 4×8 data block according to the present invention.

In FIG. 9A, a representative block diagram 900 is shown for processing an 8×4 block according to the present invention. The source 4×8 block 902 is shown having elements ranging from M00 (row zero, element zero) through M73 (row 7, element 3). Block 904 next shows the conversion process which includes adding a column of 8 zeros in an alternating manner in order to turn the 4×8 block into an 8×8 block. This 8×8 block is processed by the 2-D IDCT core 906 according the principles described above. The output from the core 908 is an 8×8 block having elements R00 through R73 in the left four columns. The right four columns 910 are discarded. Each element of the 4×8 result 912 is then multiplied by a transform coefficient 914, which in this instance equals radical 2. This final multiplication could be embedded in another transform operation already being performed. For instance, the multiplication could be embedded in the transform coefficient(s) of the second (row) transform.

Figure 9B:
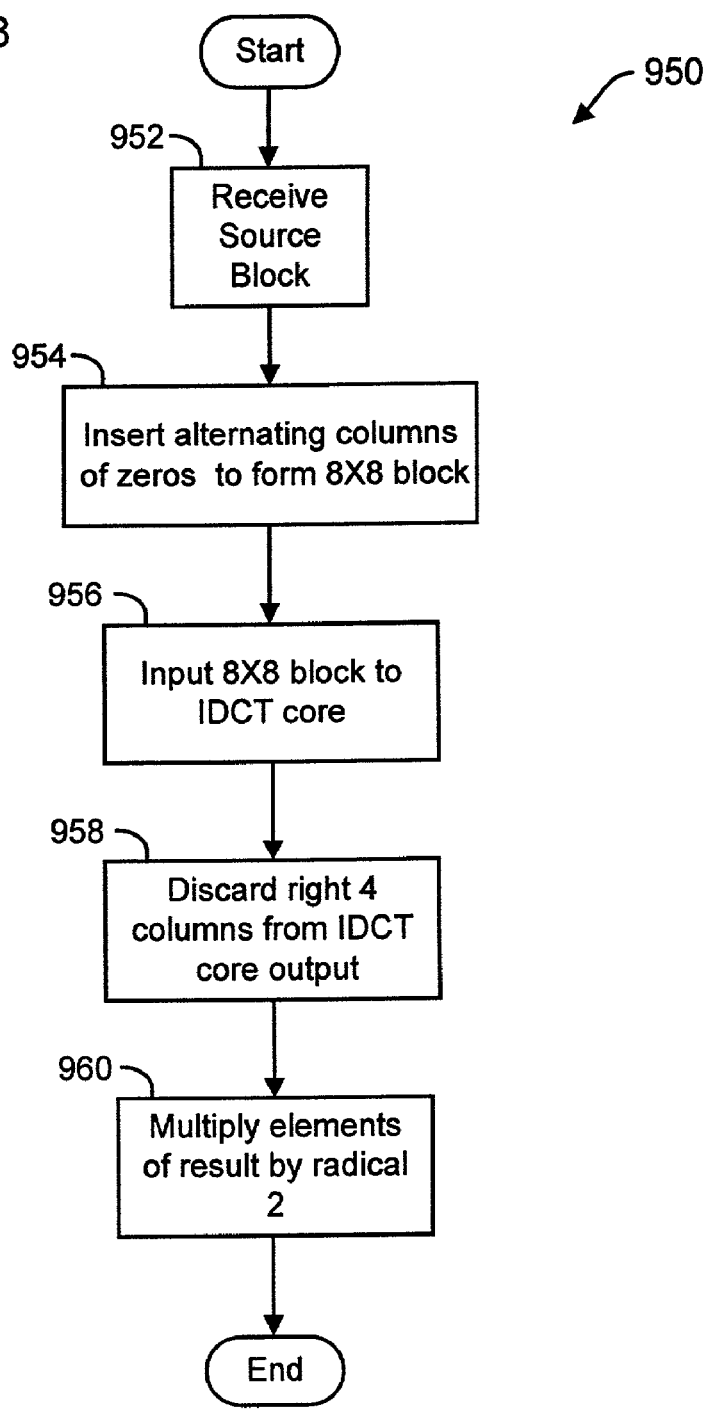
FIG. 9B is a representative flow chart for processing 4×8 source blocks in the present system.

FIG. 9B shows a similar description of the representative steps, in the form of a flowchart 950, for processing 4×8 source blocks. In step 952 the source block is first received, and a determination is made as to type of inverse processing that is needed. Step 954 shows the technique of inserting alternating rows of zeros to form an 8×8 block. In step 956, the 8×8 block is used by the IDCT core and transformed into a result. Step 958 shows the process of discarding the bottom four rows from the IDCT core output. The final result is achieved in step 960 by multiplying each of the elements of the result by radical 2.

Figure 10A:
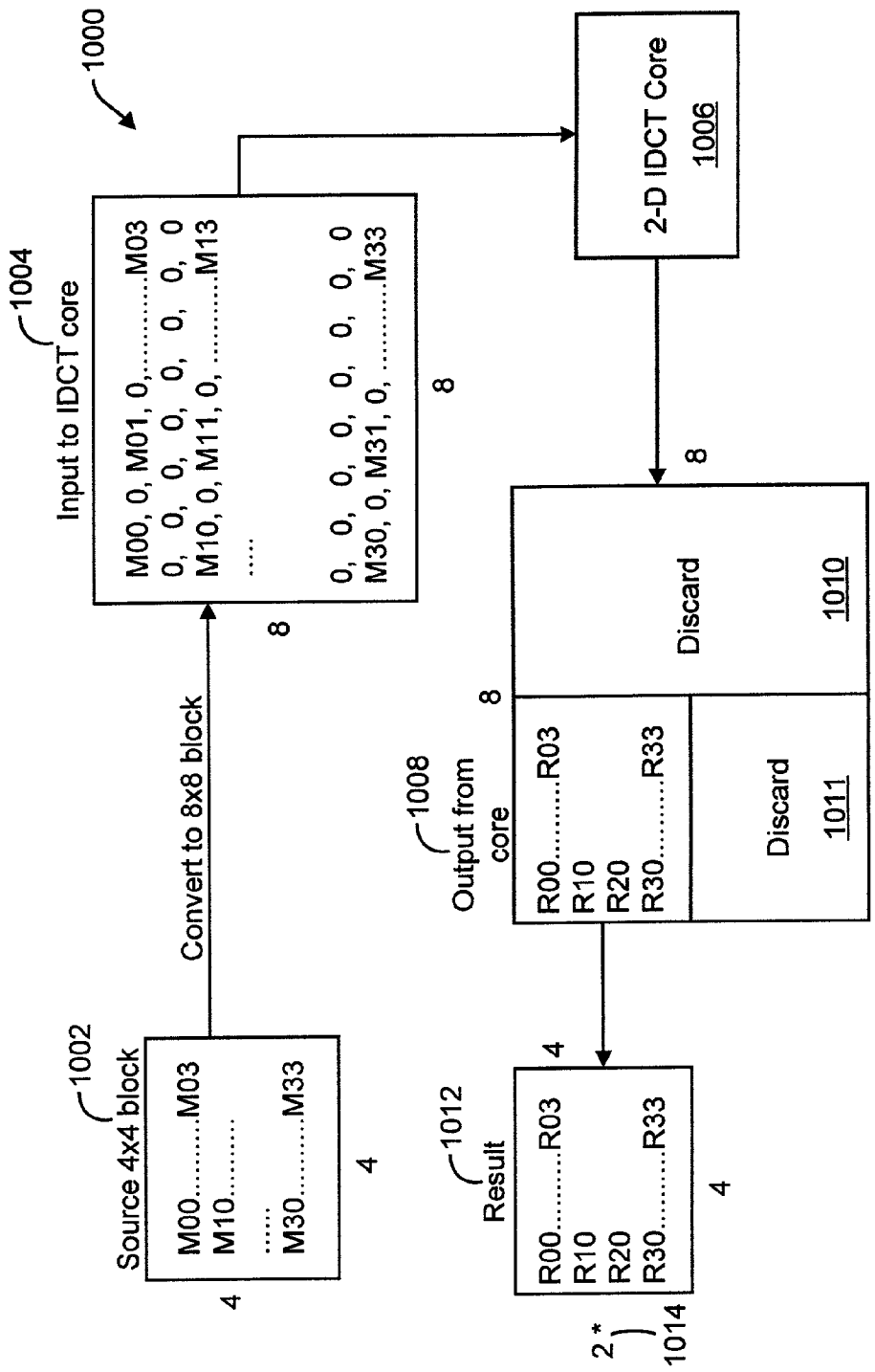
FIG. 10A is a representative block diagram of the process for transforming a 4×4 data block according to the present invention.

In FIG. 10A, a representative block diagram 1000 is shown for processing an 4×4 block according to the present invention. The source 4×4 block 1002 is shown having elements ranging from M00 (row zero, element zero) through M33 (row 3, element 3). Block 1004 next shows the conversion process which includes adding a row of 8 zeros, and column of 8 zeros, in an alternating manner, in order to turn the 4×4 block into an 8×8 block. This 8×8 block is processed by the 2-D IDCT core 1006 according the principles described above. The output from the core 1008 is an 8×8 block having elements R00 through R33 in the upper left quadrant. The right four columns 1010, and the bottom four rows 1011 are discarded. Each element of the 4×4 result 1012 is then multiplied by a transform coefficient 1014, which in this instance equals integer 2. This final multiplication could be embedded in another transform operation already being performed. For instance, the multiplication could be done in the final rounding/saturation stage of the second 1-D transform. If the transform algorithm is based on 4-point rather than 8-point transforms, then in order to speed up the performance, certain flags can be set to perform only 4-point operations (rather than switching back and forth between 4-point and 8-point operations).

Figure 10B:
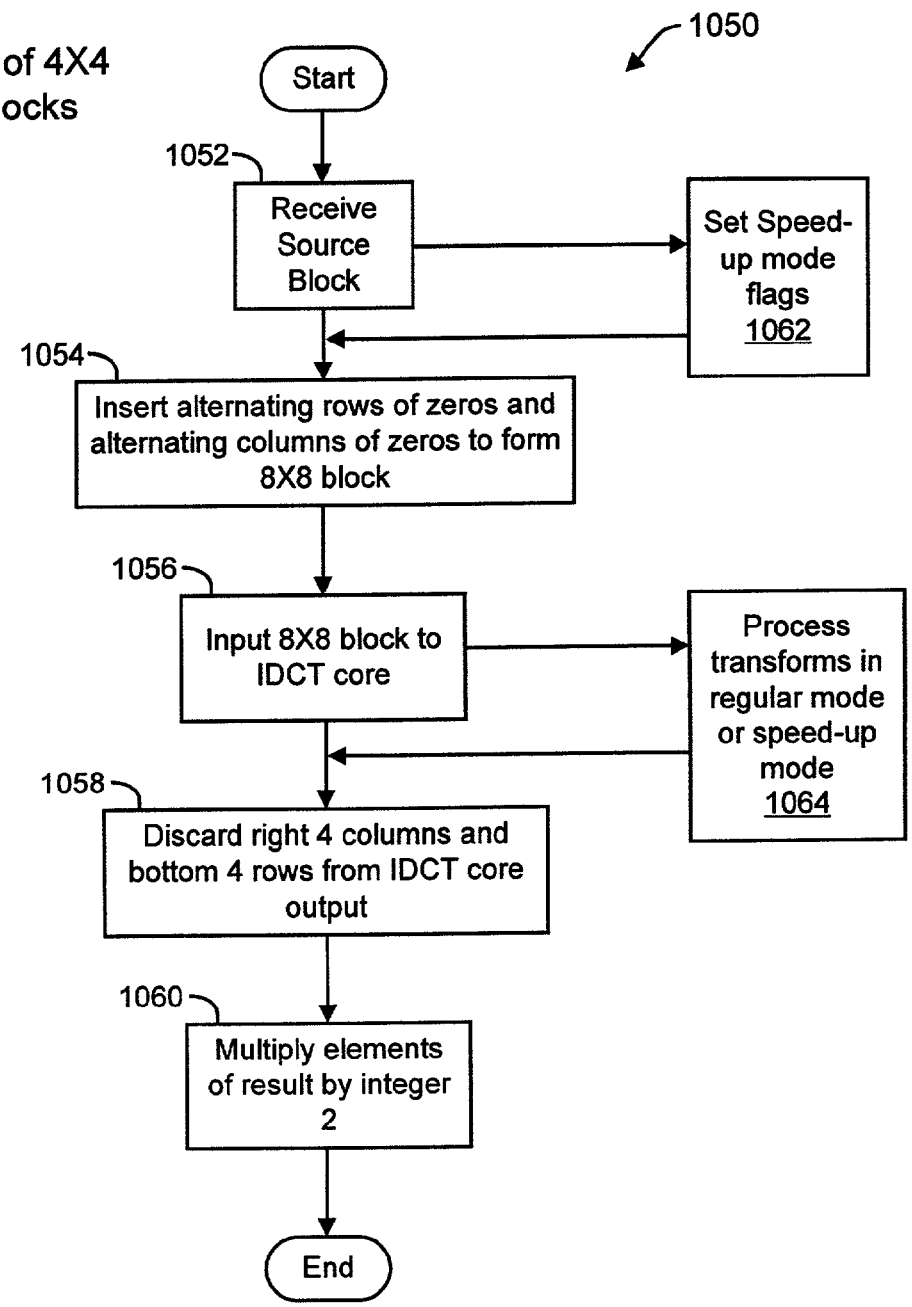
FIG. 10B is a representative flow chart for processing 4×4 source blocks in the present system.

FIG. 10B shows a similar description of the representative steps, in the form of a flowchart 1050, for processing 4×4 source blocks. In step 1052 the source block is first received, and a determination is made as to the type of inverse processing that is needed. If the speed-up mode is available, step 1062 shows the process of setting certain speed-up mode flags. Step 1054 shows the technique of inserting alternating rows of zeros to form an 8×8 block. In step 1056, the 8×8 block is used by the IDCT core and transformed into a result. Step 1064 shows the use of a "regular mode" or a "speed-up" mode (depending upon certain flags that have been set), wherein an 8-point or 4-point transform is used. Step 1058 shows the process of discarding the bottom four rows from the IDCT core output. The final result is achieved in step 1060 by multiplying each of the elements of the result by integer 2.

Still other applications might not use IDCT in every instance. For instance, for H26L applications, instead of using an IDCT, an integer with basically the same coding property as 4×4 IDCT is used. The inverse transform of coefficients X(0), X(1), X(2), and X(3) into 4 pixel representations Y(0), Y(1), Y(2), and Y(3) is defined by:

$$\begin{bmatrix} Y(0) \\ Y(1) \\ Y(2) \\ Y(3) \end{bmatrix} = \begin{bmatrix} a & c & a & f \\ a & f & -a & -c \\ a & -f & -a & c \\ a & -c & a & -f \end{bmatrix} \begin{bmatrix} X(0) \\ X(1) \\ X(2) \\ X(3) \end{bmatrix} \quad (4)$$

Where a=13, c=17, and f=7. The inverse transform can be achieved by using the same IDCT core with programming of the transform coefficients to be a=13, c=17, and f=7. In H26L, the implementation can perform 4-point transforms instead of 8-point transforms by setting appropriate flags for each 1-D or 2-D transform block.

Although certain exemplary embodiments of the present invention have been described, it should not be construed to limit the scope of the appended claims. For example, the present invention can be implemented by both a software embodiment or a hardware embodiment. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive. It is therefore intended that the following claims be interpreted as covering all such alterations and modifications as fall within the true spirit and scope of the invention.

The invention claimed is:

1. An inverse discrete cosine transform apparatus comprising:
   an inverse discrete cosine transform core for receiving incoming data in the frequency domain and transforming the data to spatial domain, the inverse discrete cosine transform core being configured to convert an incoming M×N data block into an N'×N' data block, process the N'×N' data block to produce an N'×N' output block, and derive and M×N result from N'×N' output block; and
   a memory device associated with the inverse discrete cosine transform core for storing transform coefficients for transforming the pixel data according to an associated coding standard,
   wherein the appropriate transform coefficients are loaded into the memory device according to the coding standard of the incoming data, and an inverse discrete cosine transform operation is performed by the transform core according to the stored transform coefficients.

2. The inverse discrete cosine transform apparatus of claim 1, wherein the transform core includes a first one-dimensional inverse discrete cosine transform device in association with a second one-dimensional inverse discrete cosine transform device.

3. The inverse discrete cosine transform apparatus of claim 2, wherein the transform core includes a transpose memory device between the first one-dimensional inverse discrete cosine transform device which handles column data, and the second one-dimensional inverse discrete cosine transform device which handles row data.

4. The inverse discrete cosine transform apparatus of claim 1, wherein N'×N' data block is an 8×8 data block.

5. The inverse discrete cosine transform apparatus of claim 1, wherein a speed-up mode flag is included and set according to the transform algorithm to be employed.

6. The inverse discrete cosine transform apparatus of claim 5, wherein if the speed-up mode flag is set, a 4-point transform algorithm is employed.

7. The inverse discrete cosine transform apparatus of claim 5, wherein if the speed-up mode flag is not set, an 8-point transform algorithm is employed.

8. A method for processing inverse discrete cosine data transform data blocks via a programmable inverse discrete cosine transform device, the method comprising the steps of:
   receiving an N×M source block;
   converting the N×M Source block to an N'×N' data block;
   loading transform coefficients corresponding to a certain coding standard into a memory device associated with the programmable inverse discrete cosine transform device;
   applying inverse discrete cosine data transformation to the N'×N' data block via use of the loaded transform coefficients to produce an N'×N' output block; and
   deriving an N×M result from the N'×N' output block.

9. The method of claim 8, wherein the programmable inverse discrete cosine transform device includes a two-dimensional device comprised of a first one-dimensional device coupled with a second one-dimensional device.

10. The method of claim 8, wherein the N×M source block is a 8×4 source block, and the N'×N' data block is an 8×8 data block, whereby the converting step includes inserting alternating rows of zeros into the 8×4 source block to convert it to an 8×8 data block, and the deriving step includes discarding the bottom four rows from the 8×8 output block to form the 8×4 result.

11. The method of claim 10, wherein the deriving step further includes multiplying each element of the result by a transform constant of radical 2.

12. The method of claim 10, wherein the step of multiplying by the transform constant is embedded in the transform coefficients.

13. The method of claim 8, wherein the N×M source block is a 4×8 source block, and the N'×N' data block is an 8×8 data block, whereby the converting step includes inserting alternating columns of zeros into the 4×8 source block to convert it to an 8×8 data block, and the deriving step includes discarding the right 4 columns from the 8×8 output block to form the 4×8 result.

14. The method of claim 13, wherein the deriving step further includes multiplying each element of the result by radical 2.

15. The method of claim 14, wherein the step of multiplying by the transform constant is embedded in the transform coefficients.

16. The method of claim 8, wherein the N×M source block is a 4×4 source block, and the N'×N' data block is an 8×8 data block, whereby the convening step includes inserting alternating columns of zeros and alternating rows of zeros into the 4×4 source block to convert it to an 8×8 data block, and the deriving step includes discarding the right 4 columns and the bottom four rows from the 8×8 output block to form the 4×4 result.

17. The method of claim 16, wherein the deriving step further includes multiplying each element of the result by integer 2.

18. The method of claim 17, wherein the step of multiplying by the transform constant is embedded in the transform coefficients.

* * * * *